United States Patent
Olderdissen et al.

(10) Patent No.: US 10,055,219 B1
(45) Date of Patent: Aug. 21, 2018

(54) DYNAMICALLY PREPARING SERVER-SPECIFIC INSTALLATION IMAGES USING A VIRTUAL MEDIA SOURCE NODE

(71) Applicant: Nutanix, Inc., San Jose, CA (US)

(72) Inventors: Jan Ralf Alexander Olderdissen, Herrenberg (DE); Amit Jambure, Maharashtra (IN)

(73) Assignee: Nutanix, Inc., San Jose, CA (US)

( * ) Notice: Subject to any disclaimer, the term of this patent is extended or adjusted under 35 U.S.C. 154(b) by 65 days.

(21) Appl. No.: 15/093,651

(22) Filed: Apr. 7, 2016

(51) Int. Cl.
- G06F 9/44 (2018.01)
- G06F 8/654 (2018.01)
- G06F 9/445 (2018.01)
- G06F 8/61 (2018.01)
- H04L 29/08 (2006.01)

(52) U.S. Cl.
CPC ............. *G06F 8/654* (2018.02); *G06F 8/63* (2013.01); *G06F 8/665* (2013.01); *H04L 67/34* (2013.01)

(58) Field of Classification Search
CPC .............. G06F 8/65; G06F 8/61; G06F 8/68
USPC ........................................................ 717/169
See application file for complete search history.

(56) References Cited

U.S. PATENT DOCUMENTS

| | | | | |
|---|---|---|---|---|
| 5,778,234 A | * | 7/1998 | Hecht | G06F 8/60 713/2 |
| 2014/0123122 A1 | * | 5/2014 | Dhanyamraju | G06F 8/65 717/168 |
| 2016/0070563 A1 | * | 3/2016 | Ingle | G06F 8/63 717/172 |
| 2017/0090909 A1 | * | 3/2017 | Guo | G06F 8/66 |
| 2017/0131996 A1 | * | 5/2017 | Crosby | G06F 8/665 |
| 2017/0262386 A1 | * | 9/2017 | Chew | G06F 12/1441 |

OTHER PUBLICATIONS

Red Hat Customer Portal, "32.4. Kickstart Options", Dec. 1, 2015 url: https://access.redhat.com/documentation/en-US/Red_Hat_Enterprise_Linux/6/html/Installation_Guide/s1-kickstart2-options.html.

ArchWiki, "Overlay filesystem" Jun. 30, 2015, 2 pages url: https://wiki.archlinux.org/index.php/Overlay_filesystem.

* cited by examiner

Primary Examiner — John Chavis
(74) Attorney, Agent, or Firm — Vista IP Law Group, LLP

(57) ABSTRACT

Systems for computing cluster management. A boot media source node is connected to a computing cluster. Boot image patching operations commence upon receiving, by the boot media source node, communications from at least one computing node of a plurality of computing nodes of the computing cluster. Such a communication comprises an indication of an address range of a requested segment of a boot image. The boot media source node retrieves a patch to be applied over the requested segment. The overlap range of the retrieved patch and the requested segment are calculated. The boot media source node processes the patch by allocating a segment in volatile memory of the server node, and forming an in-memory patched segment without storing the patched segment to non-volatile memory. The in-memory patched segment is delivered to the requestor and the boot media source node receives next segments from the same or different computing nodes.

20 Claims, 15 Drawing Sheets

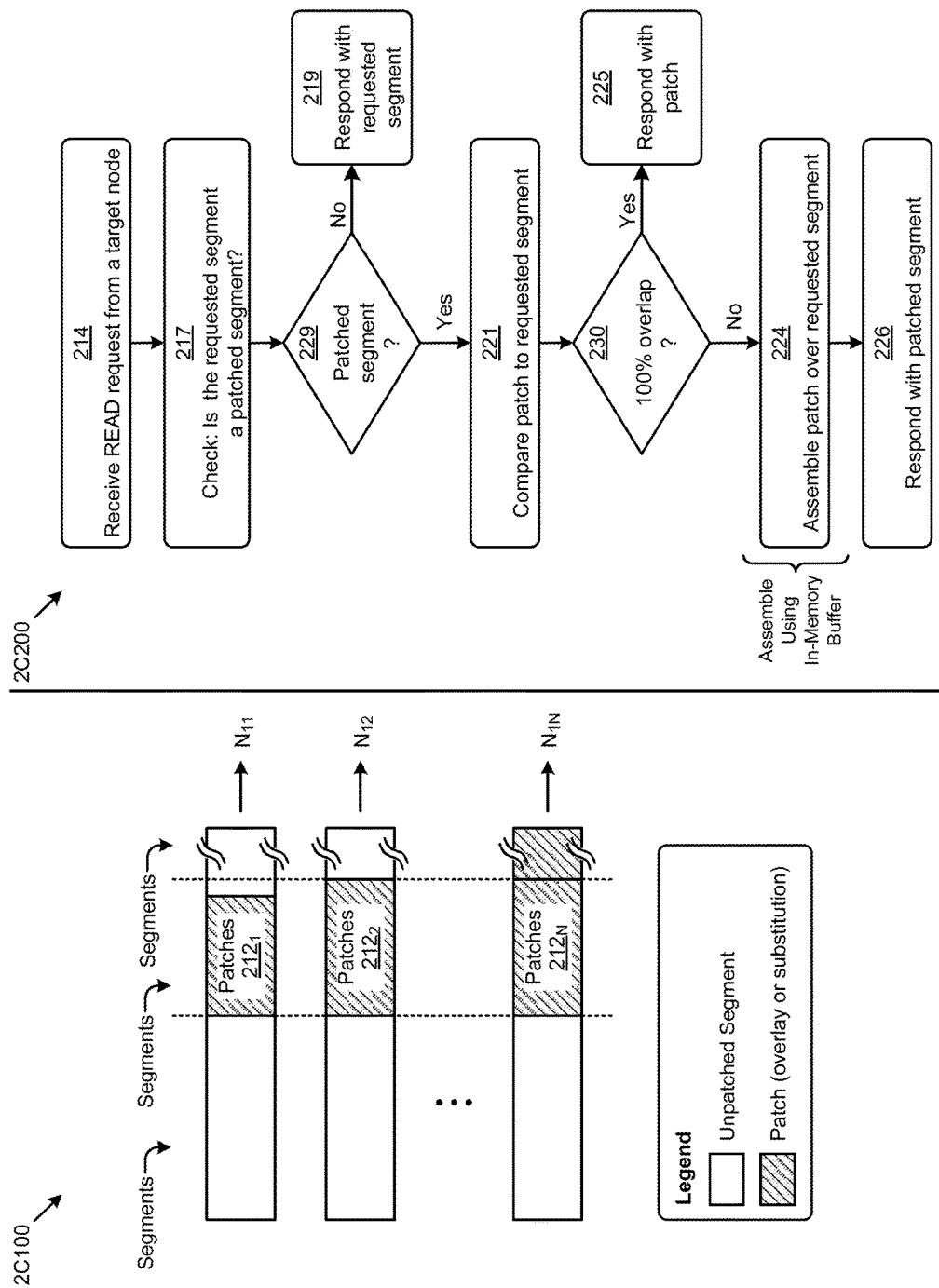

DYNAMICALLY PREPARING SERVER-SPECIFIC INSTALLATION IMAGES USING A VIRTUAL MEDIA SOURCE NODE

FIELD

This disclosure relates to managing computing environments, and more particularly to techniques for dynamically patching installation images using virtual image files.

BACKGROUND

Some computing environments are made up of groups of processors (e.g., arrays, racks, towers, clusters, hyper-cubes, large groups of servers, etc.), and sometimes the number of nodes (e.g., servers, multi-core processors, etc.) that are used by enterprises and others entities can become large (e.g., hundreds of servers, thousands, etc.). In many cases an entire installation might need to be reconfigured to meet the computing needs of the enterprise or other entity. For example, an installation of 256 processors might need to be configured with a Microsoft operating system for a first enterprise, and then all 256 processors might need to be reconfigured to run a Linux operating system for a different, second enterprise.

Often, each individual processor instance needs to boot from an ISO image that has been customized for each respective individual processor. For example, an ISO image might comprise several hundred megabytes that contains the operating system (e.g., Microsoft OS or Linux OS, etc.), plus a few megabytes that comprise patches (security patches, etc.), plus a few megabytes that comprise images of virtual machines that run on top of the hypervisor, etc. In some cluster installations, the total number of unique ISO configurations can approach or equal the total number of processor instances in the cluster.

A further processing element can serve as an orchestrator for configuring/reconfiguring the group of processors. The orchestrator reads configuration data (e.g., a list of nodes and respective configuration specifications) and manages the imaging and boot-up process for each processor in the cluster. In situations where there are a large number of ISO images that have been customized for each respective individual processor, the images are assembled and stored, and the orchestrator processes the imaging and boot-up process for as many as can be concurrently imaged, stored and booted. In many cases, the ISO images that have been customized for each respective individual processor can be imaged to the recipient processor (e.g., over an intelligent platform management interface (IPMI) or network file system (NFS)), and then deleted when the processor has been successfully imaged.

Unfortunately, even for a relatively small group of 256 nodes, the storage space needed for handling images in legacy implementations can reach 256 customized images— far too large. For larger installations with 1024 or more processors, the storage demands needed for up to 1024 customized images becomes utterly unwieldy, easily outstripping the available storage scratch space of even large modern hard disk drives (HDDs) and solid state disks (SSDs). Moreover, some system administration use cases involve use of a small external node such as a laptop from which to perform configuring and/or reconfiguring the group of processors. Techniques are needed to support reimaging of even very large groups of processors without placing severe or impossible demands on the storage space needed on the external node. What is needed is a technique that generates processor-specific image configurations (e.g., ISO configurations), and that do not require huge areas for storage.

What is needed is a technique or techniques to improve over legacy approaches.

SUMMARY

The present disclosure provides a detailed description of techniques used in systems, methods, and in computer program products for dynamically preparing server-specific installation images using a virtual media source node, which techniques advance the relevant technologies to address technological issues with legacy approaches. More specifically, the present disclosure provides a detailed description of techniques used in systems, methods, and in computer program products for dynamically preparing server-specific installation images using a virtual media source node. Certain embodiments are directed to technological solutions for dynamically patching installation images using a virtual media source node, which embodiments advance the relevant technical fields as well as advancing peripheral technical fields.

The disclosed embodiments modify and improve over legacy approaches. In particular, the herein-disclosed techniques provide technical solutions that address technical problems attendant to processing a large number of individually-customized boot images for each processor in a group of processor nodes. Such technical solutions serve to reduce the demand for computer memory, reduce the demand for computer processing power, and reduce the demand for inter-component communication. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of high-performance computing as well as advances in various technical fields related to distributed storage.

In an exemplary configuration, a boot media source node is connected to a computing cluster. Boot image patching operations commence upon receiving, by the boot media source node, communications from at least one computing node of a plurality of computing nodes of the computing cluster. Such a communication comprises an indication of an address range of a requested segment of a boot image. The boot media source node retrieves a patch to be applied over the requested segment. The overlap range of the retrieved patch and the requested segment are calculated. The boot media source node processes the patch by allocating a segment in volatile memory of the server node, and forming an in-memory patched segment without storing the patched segment to non-volatile memory. The in-memory patched segment is delivered to the requestor and the boot media source node receives next segments from the same or different computing nodes.

Further details of aspects, objectives, and advantages of the technological embodiments are described herein and in the following descriptions, drawings, and claims.

BRIEF DESCRIPTION OF THE DRAWINGS

The drawings described below are for illustration purposes only. The drawings are not intended to limit the scope of the present disclosure.

FIG. 2C1 depicts variants of source images that are subjected to patching operations.

FIG. 2C2 depicts patching operation variations performed over source images so as to support variations of patching operations, according to an embodiment.

DETAILED DESCRIPTION

Embodiments of the present disclosure address the problems that arise from techniques that store a large number of individually-customized boot images (e.g., one image for each processor) when updating a large group of processors. More particularly, disclosed herein and in the accompanying figures are exemplary environments, systems, methods, and computer program products for dynamically preparing server-specific installation images using a virtual media source node.

OVERVIEW

Figure 5A:
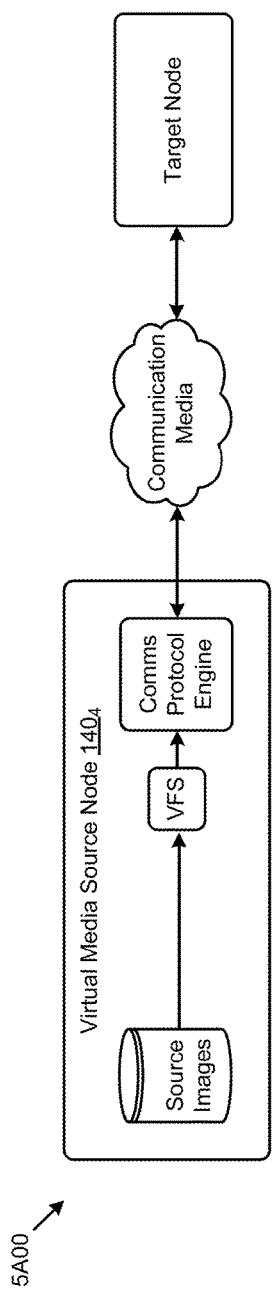
FIG. 5A, FIG. 5B, FIG. 5C, FIG. 5D, and FIG. 5E depict implementation views of user space file system access as used in systems that dynamically patch images using a user-space file system, according to some embodiments.
Figure 5B:
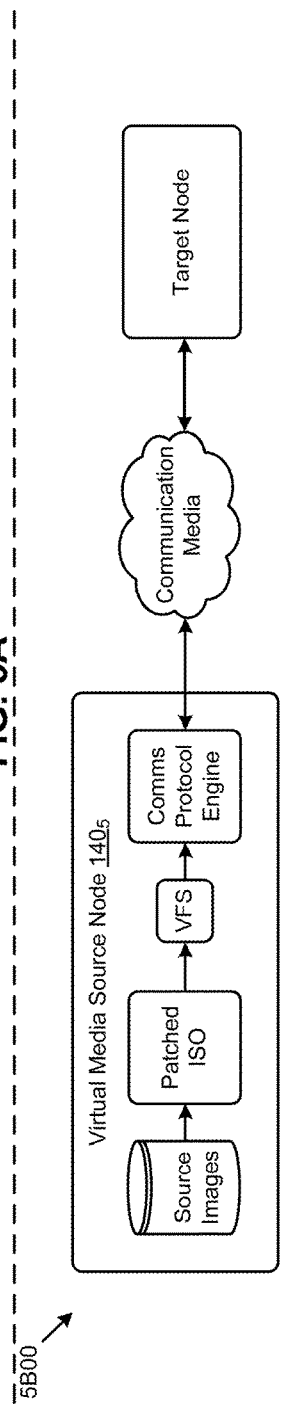
Figure 5C:
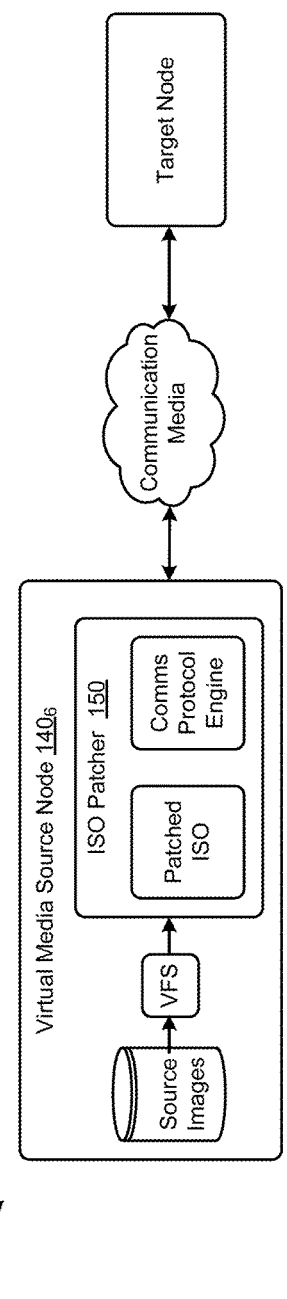
Figure 5D:
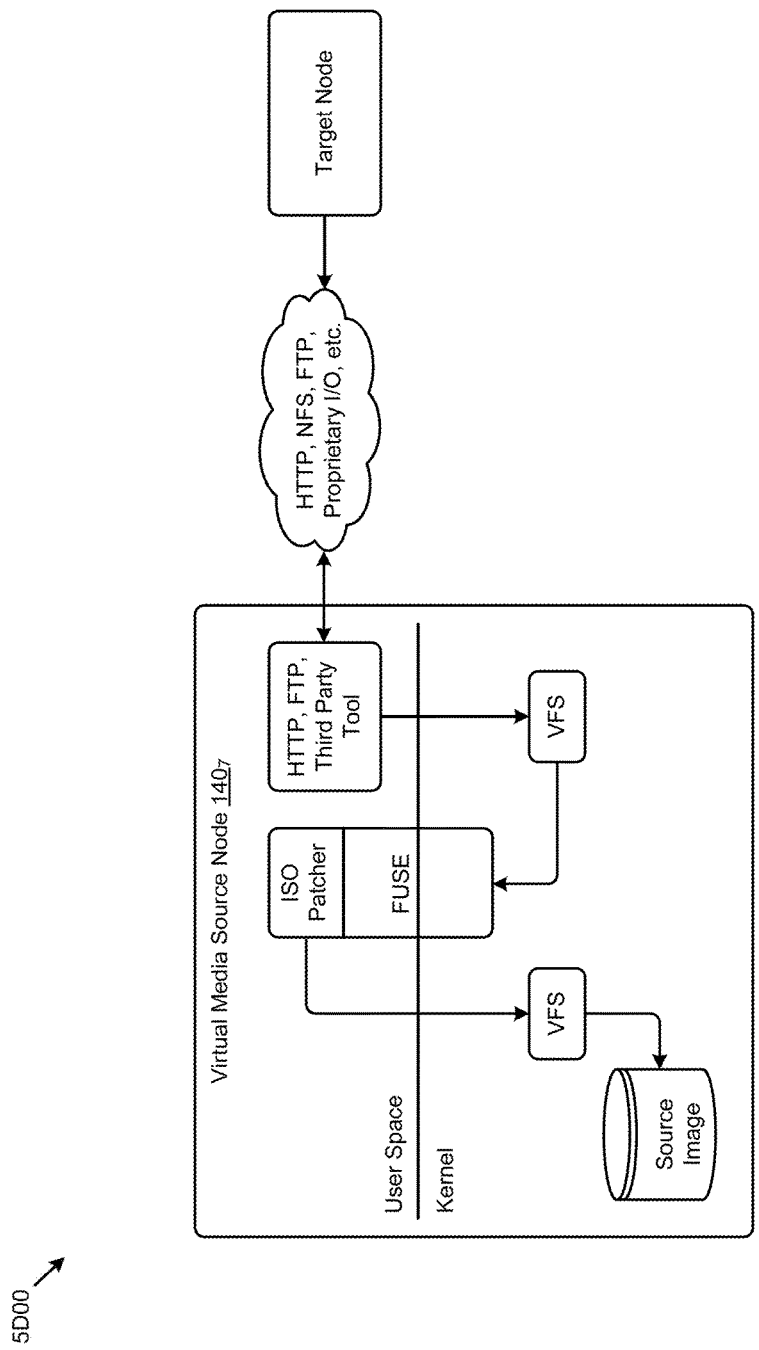
Figure 5E:
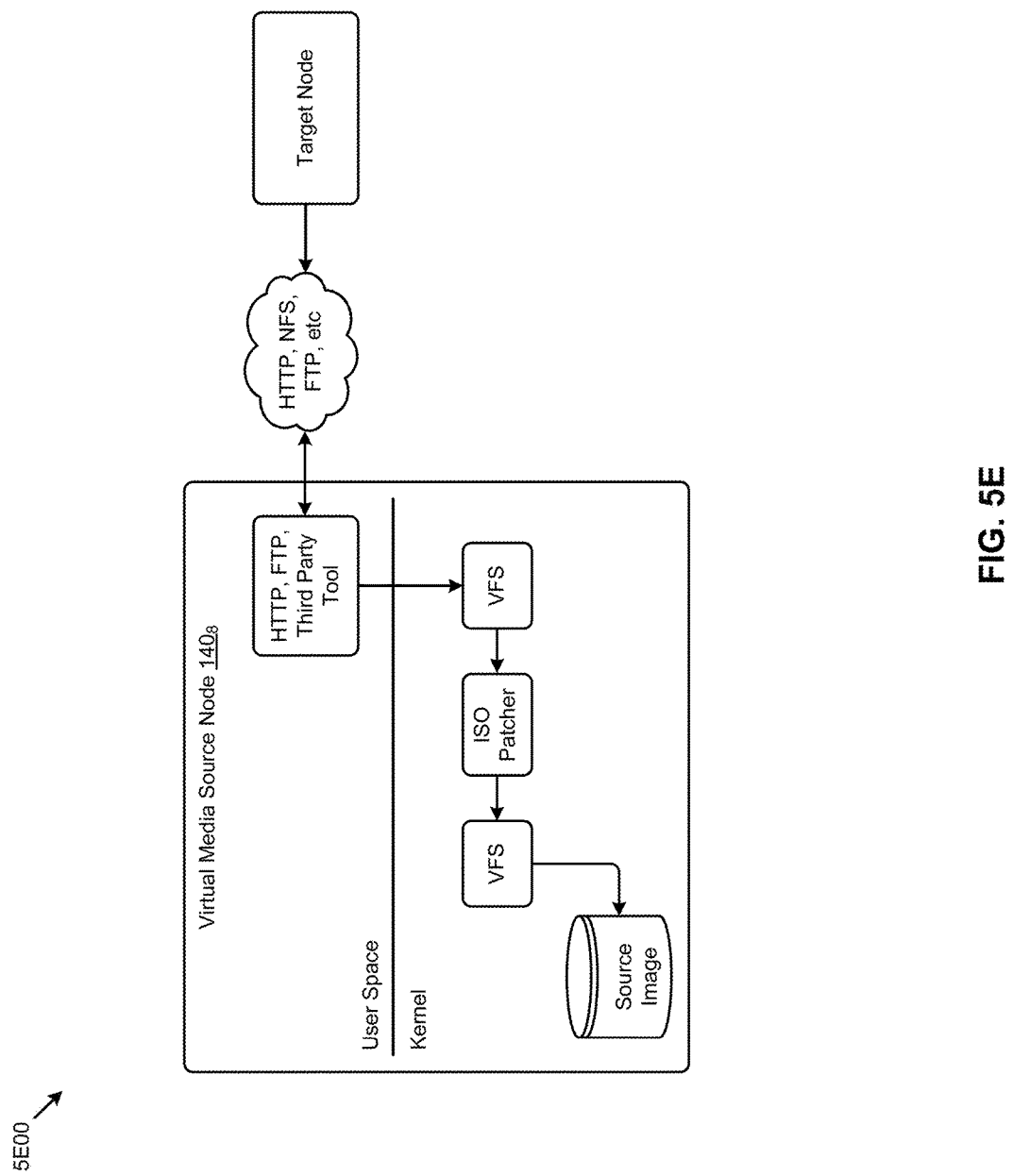

A group of many servers might need to be configured with a first operating system for a first enterprise, and then all of the servers in the group might need to be reconfigured to run a second operating system. An orchestrator or patching process can serve images to processing elements. Some such orchestrator processes are intended to oversee an arbitrary number of processor installations concurrently. In some installations, the orchestrator addresses the target processing element through the device's IPMI or other interface, mounts installation images through IPMI or NFS, then directs the target device to boot off of the mounted image. To reduce the total elapsed time that the patching process consumes for performing a configuration or reconfiguration, it is desirable to run with as much concurrency as possible, however for large installations (e.g., installations with hundreds or thousands or more individually-imaged servers), disk space to hold the mounted images becomes a limiting factor. Disclosed herein are techniques for dynamically generating virtual copies of ISOs (e.g., one virtual copy per node) rather than generating actual copies for each node. When generating virtual copies of ISOs, the ISO images are customized to contain server-specific configuration items. Duplication is reduced or eliminated (see FIG. 1C). Some of the techniques needed to do so rely on the existence of file systems in user space (see FIG. 5D) where components of an ISO can be retrieved and/or touched up in a node-specific manner.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment. An aspect or an advantage described in conjunction with a particular embodiment is not necessarily limited to that embodiment and can be practiced in any other embodiments even if not so illustrated. Also, references throughout this specification to "some embodiments" or "other embodiments" refers to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

DESCRIPTIONS OF EXEMPLARY EMBODIMENTS

Figure 1A:
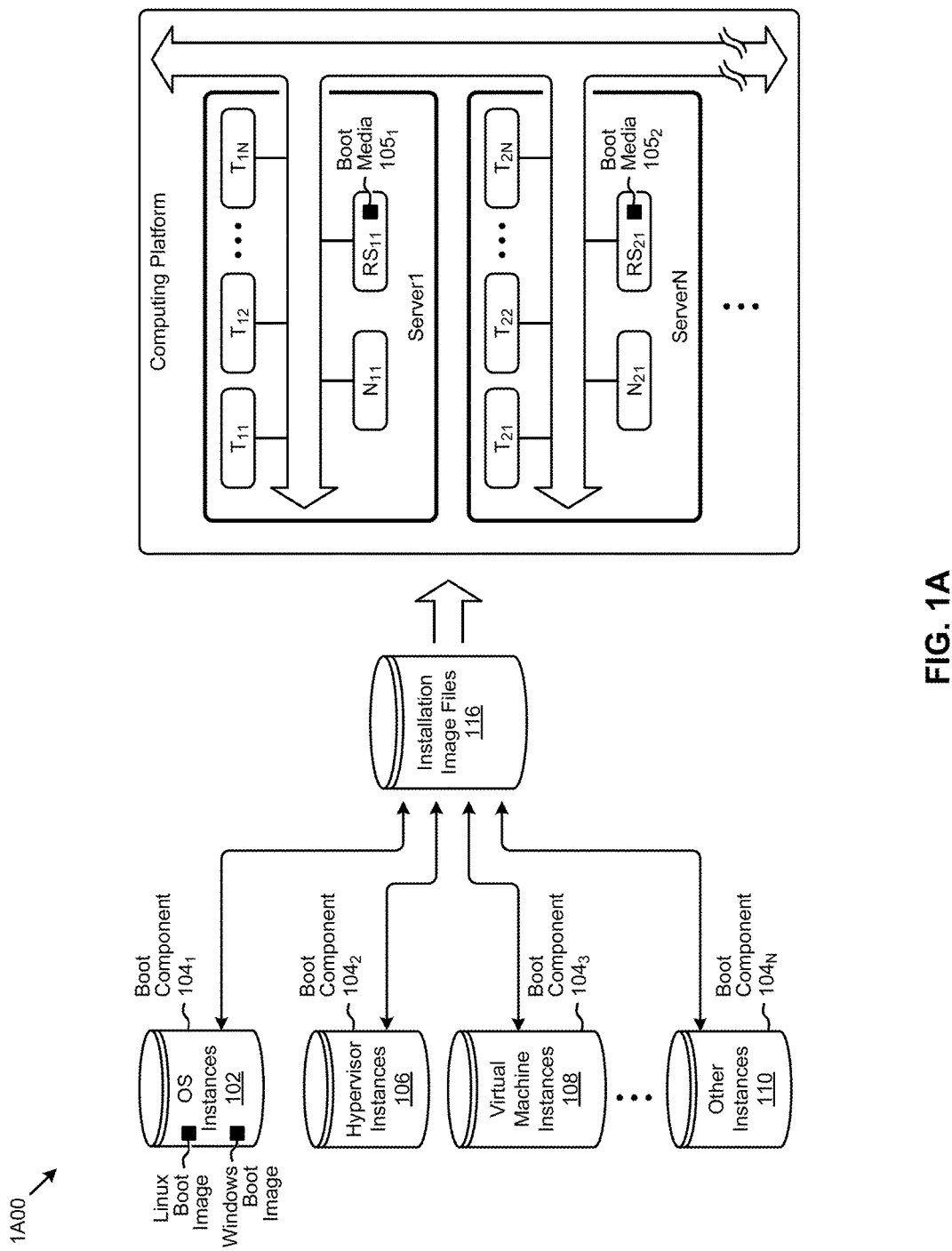
FIG. 1A depicts a sample of boot media to be loaded into the processing elements within a server group, according to some embodiments.

FIG. 1A depicts a sample of boot media to be loaded into the processing elements within a server group 1A00. As an option, one or more variations of server group 1A00 or any aspect thereof may be implemented in the context of the architecture and functionality of the embodiments described herein. Also, the server group 1A00 or any aspect thereof may be implemented in any environment.

As shown, the computing platform comprises groups of servers. Any individual server can comprise of one or more CPUs (e.g., CPU $T_{11}$, CPU $T_{12}$, ..., CPU $T_{1N}$; CPU $T_{21}$, CPU $T_{22}$, ..., CPU $T_{2N}$), and any CPU may include a single core or multiple cores. A server comprises memory (e.g., per CPU local memory or shared memory), network hardware (e.g., $N_{11}$), and a storage facility (e.g., $RS_{21}$) that is possibly embodied as local storage or as an access point to networked storage. Using any variation of one or more storage facilities, a CPU has access to a BIOS image or unified extensible firmware interface (UEFI). A server can be standalone, (e.g., with its own chassis and power supply) or a group of servers can be partitioned into a shared chassis and/or interconnected so as to receive power from a shared power supply. In some cases the concepts of the aforementioned servers can be applied to a collection of desktop computers, laptop computers, and/or any other type of compute node that supports some form of access to shared files.

FIG. 1A also shows a repository of installation images (e.g., installation image files 116). The contents of such installation images can derive from various of boot components (e.g., boot component $104_1$, boot component $104_2$, boot component $104_3$, boot component $104_N$), which in turn can derive from OS instances 102 (e.g., comprising a Linux boot image, a Windows boot image, etc.), hypervisor instances 106 (e.g., comprising a VMWare ESX installable image or other hypervisor as a boot image), virtual machine instances 108 (e.g., comprising a boot image), or other instances 110 (e.g., comprising a boot image) such as containers (see FIG. 7B). Using any known technique, all or portions of the contents of the installation image files and/or components thereto can be stored in one or more locations accessible to the CPUs (e.g., see boot media $105_1$, and boot media $105_2$).

In various situations, the boot media accessed by the CPUs may need to be updated, which in some scenarios is accomplished by applying a "patch" to a portion of an image in a procedure called "patching". Such a patching technique is shown and discussed as pertains to FIG. 1B.

Figure 1B:
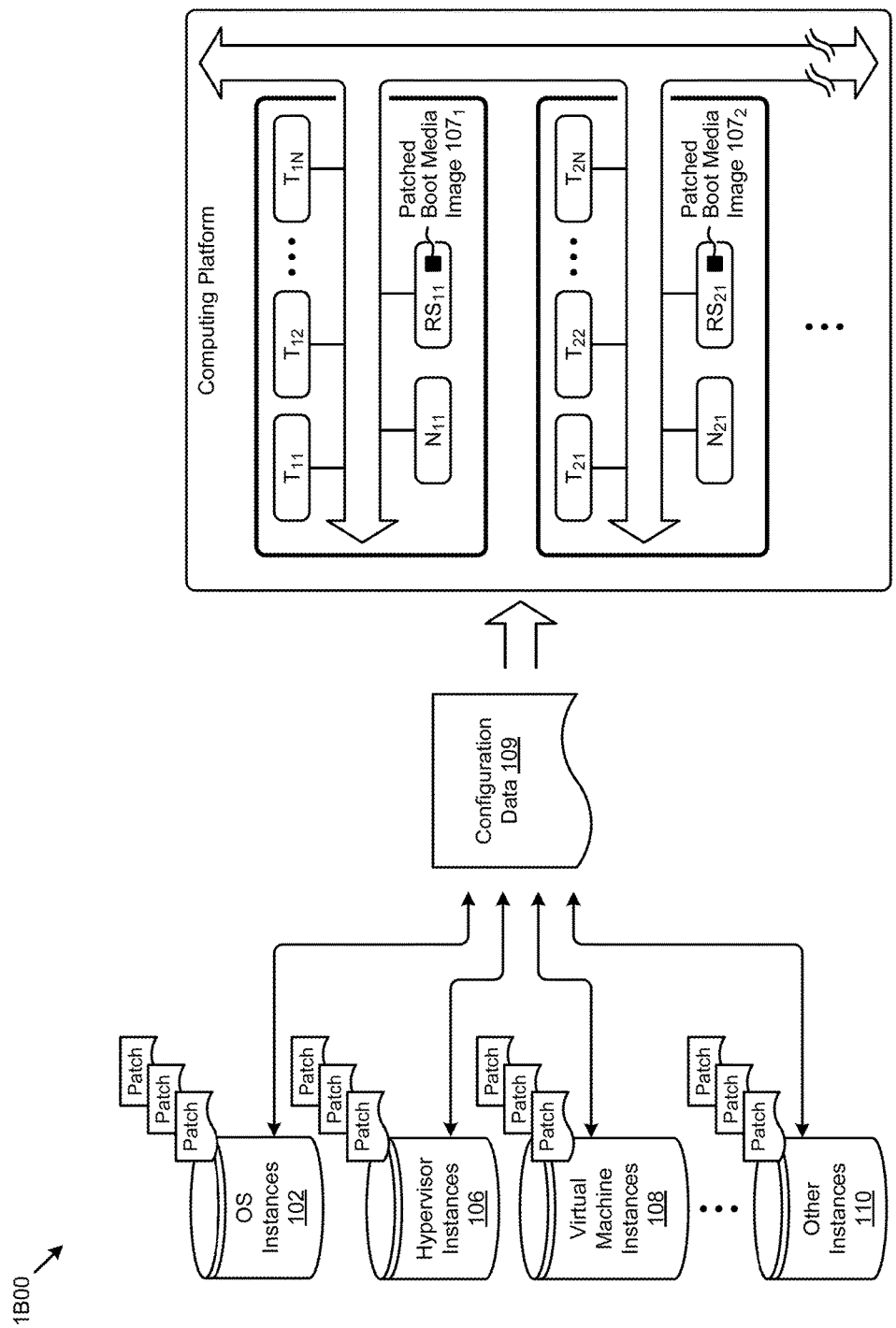
FIG. 1B depicts a boot media patching technique that applies patches to form ISO images for presentation to processing elements as an ISO image, according to some embodiments.

FIG. 1B depicts a boot media patching technique 1B00 that applies patches to form ISO images for presentation to processing elements as an ISO image. As an option, one or more variations of boot media patching technique 1B00 or any aspect thereof may be implemented in the context of the architecture and functionality of the embodiments described herein. Also, the boot media patching technique 1B00 or any aspect thereof may be implemented in any environment.

As shown, any images or instances (e.g., OS instances 102, hypervisor instances 106, virtual machine instances 108, or other instances 110) can be patched by applying patch code (or data) to particular location over the image. A patched image can be delivered to a server in the form of a patched boot media image (e.g., patched boot media image $107_1$, patched boot media image $107_2$) as shown. Moreover, configuration data 109 can be used to direct a particular patched image to a particular server. In some cases the patched boot media image might be only slightly different (e.g., only a few bytes or a small portion of the unpatched image). Management of patched boot media images can be performed on a one-stored-image-per-server basis (e.g., for smaller groups of processors), or can be performed using a virtual media source node, such as is discussed as pertaining to FIG. 1C.

Figure 1C:
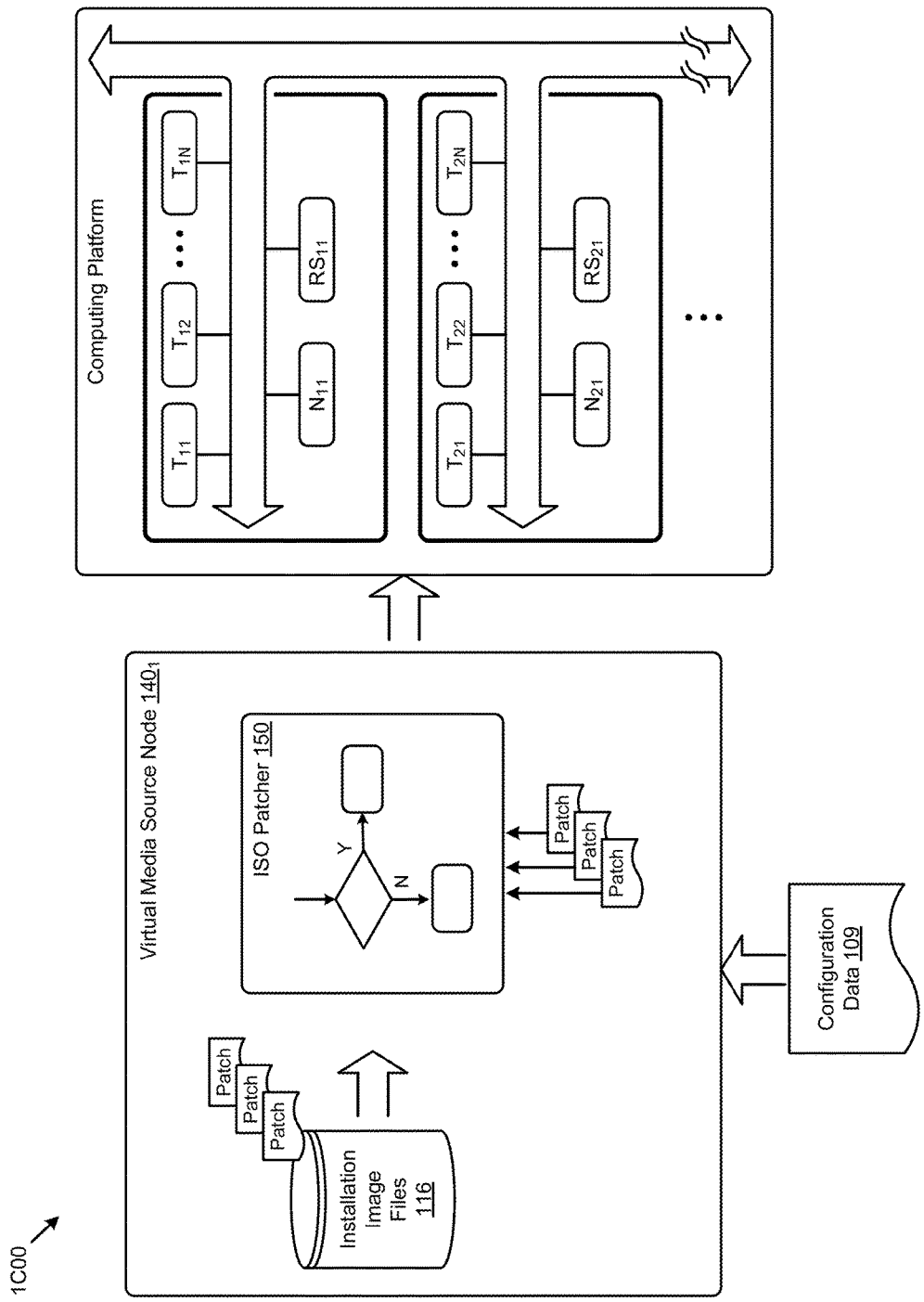
FIG. 1C depicts a boot media patching technique using a virtual media source node that applies patches to form ISO images for presentation to processing elements as an ISO image, according to some embodiments.

FIG. 1C depicts a boot media patching technique 1C00 using a virtual media source node (e.g., a processor node or a virtual machine) that applies patches to form ISO images for presentation to processing elements as an ISO image. The shown virtual media source node $140_1$ comprises a compute node (e.g., a laptop computer, a desktop computer, etc.) that supplies virtual media to a server.

As shown, the installation image files 116 plus any patches are made accessible to an ISO patcher 150. The ISO patcher in turn includes logic that determines the precise contents of the boot media to be delivered to a server. The logic can include making determinations as to whether or not a segment needs to be patched (e.g., as may be indicated by the shown configuration data 109). If a segment needs to be patched, then the segment is modified so as to include all or a portion of the patch. The logic includes cases of complete overlay as well as partial overlay. Further details regarding the logic pertaining to various cases are given in FIG. 2C1 and FIG. 2C2.

In some embodiments, a virtual media source node and/or an ISO patcher 150 may implement all or a portion of a virtual file system (VFS). As used herein, a virtual file system refers to parts of an operating system or container that presents a common view of the underlying file systems and storage. Aspects of a virtual file system can be availed so as to generate processor-specific patched ISO image configurations (e.g., ISO configurations) while only storing the minimum number of components or configurations (e.g., without unwanted duplications). Such processor-specific patched ISO image configurations can be used to perform a mass update (for example) on all of the nodes in a computing platform. One possible technique using an ISO patcher to facilitate a mass installation flow is given in FIG. 2A.

Figure 2A:
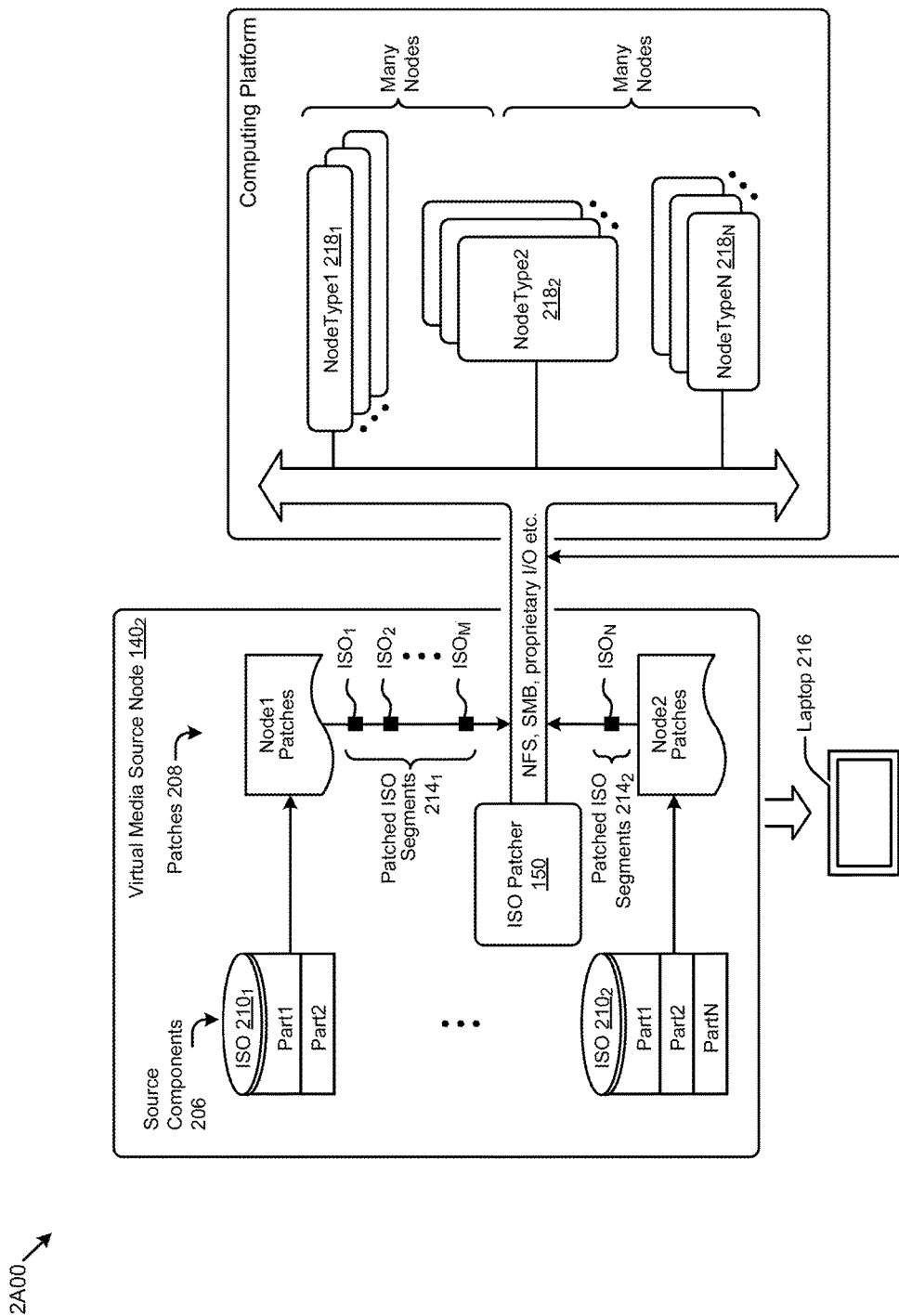
FIG. 2A depicts an installation interaction flow between a laptop-hosted ISO patcher and a multi-node computing platform, according to some embodiments.

FIG. 2A depicts an installation interaction flow 2A00 between a laptop-hosted ISO patcher and a multi-node computing platform. As an option, one or more variations of installation interaction flow 2A00 or any aspect thereof may be implemented in the context of the architecture and functionality of the embodiments described herein. Also, the installation interaction flow 2A00 or any aspect thereof may be implemented in any environment.

The embodiment shown in FIG. 2A is merely one example where an ISO patcher is implemented within a virtual media source node $140_2$ that is controlled by a laptop computer (e.g., laptop 216). Using any known techniques for communication (e.g., NFS, SMB, proprietary I/O (input/output or 1O), etc.) the ISO patcher delivers patched ISO images to the nodes of the computing platform. In some cases, and as shown, any one or more nodes may be of a heterogeneous types (e.g., NodeType1 $218_1$, NodeType2 $218_2$, ... NodeTypeN $218_N$). The shown ISO patcher 150 retrieves source components 206, which source components comprise an ISO image formed of multiple parts (e.g., Part1, Part2, PartN). The patching operation modifies the components of the ISO image (e.g., ISO $210_1$, ISO $210_2$, etc.) by applying one or more patches 208 to the selected ISO image. This sort of patching operation results in a series of patched ISO segments (e.g., patched ISO segments $214_1$, patched ISO segments $214_2$) in the form of ISO-compliant segments (e.g., $ISO_1$, $ISO_2$, $ISO_M$, $ISO_N$, etc.).

Figure 2B:
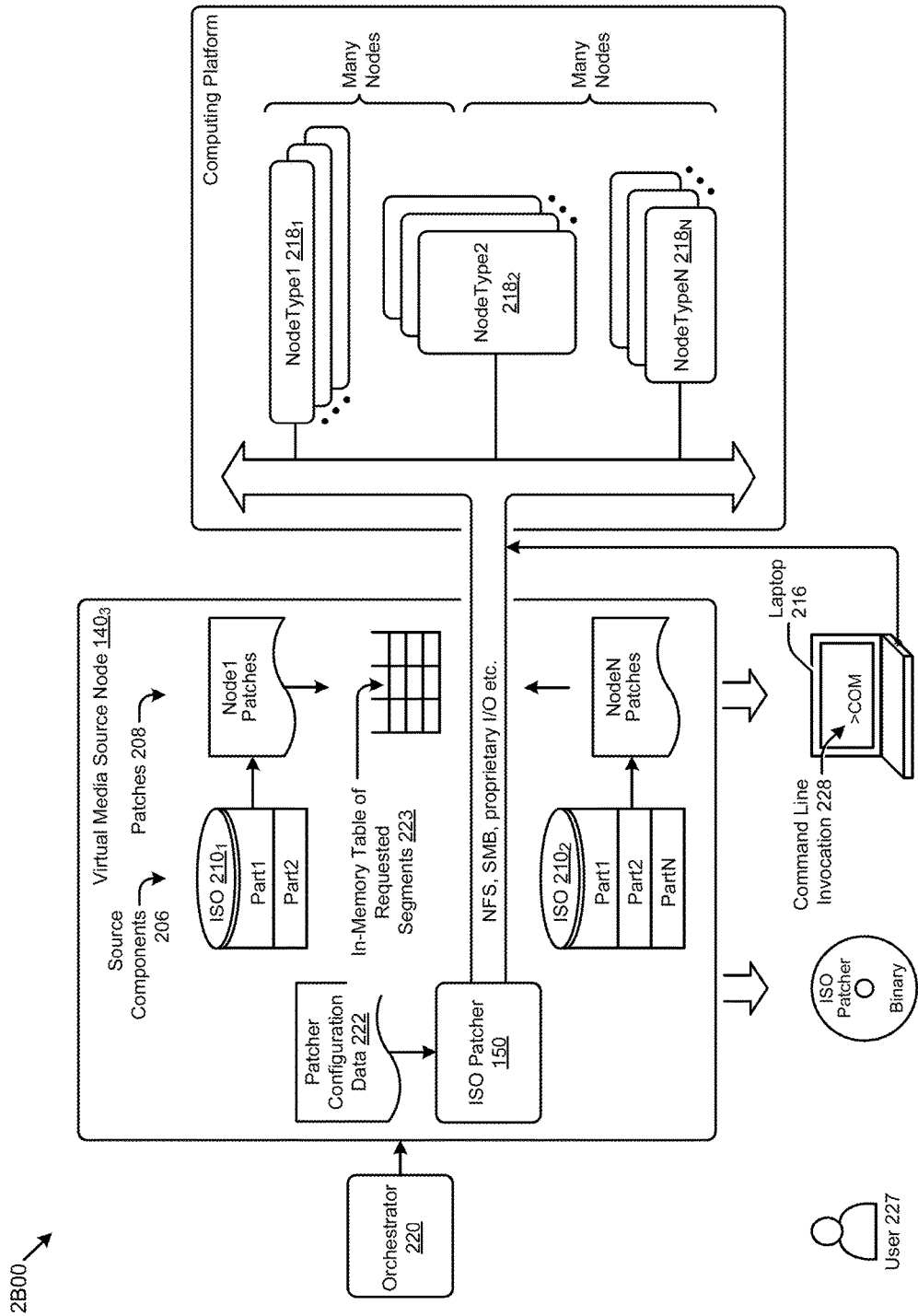
FIG. 2B depicts an environment including a laptop computer for forming dynamically patched images using a virtual media source node, according to an embodiment.

FIG. 2B depicts an environment 2B00 comprising a virtual media source node $140_3$ and a laptop computer for forming dynamically patched images. As an option, one or more variations of environment 2B00 or any aspect thereof may be implemented in the context of the architecture and functionality of the embodiments described herein. Also, the environment 2B00 or any aspect thereof may be implemented in any environment.

The embodiment shown in FIG. 2B includes a laptop 216 that may be operated by a user 227. The user, for example, may install all or portions of an ISO patcher 150 using a CDROM or other non-transitory computer readable medium to load software in the form of source code, byte code, or binary-coded instructions (as shown). In some cases the laptop supports a graphical user interface or a command line interface so as to facilitate user invocation of commands (command line invocation 228) to control configuration and/or operation of the virtual media source node and/or the orchestrator 220. The orchestrator reads any forms of configuration data 109 (e.g., see FIG. 1C) and/or patcher configuration data 222. In this and other embodiments, many nodes of many types can be patched in parallel. For example, any of the nodes of any type (e.g., NodeType1 $218_1$, NodeType2 $218_2$, NodeTypeN $218_N$) can request and receive an ISO segment at any time. In some cases (e.g., where a particular requested ISO segment is relatively larger), it is possible that a second node will issue a request before the request for the particular requested ISO segment has been completely fulfilled. Accordingly, an in-memory repository of requested segments 223 can be maintained, at least until the request for the particular requested ISO segment has been completely fulfilled.

The repositories of ISO images (e.g., ISO $210_1$, ISO $210_2$, etc.) can be heterogeneous so as to accommodate the situation where the computing cluster comprises heterogeneous nodes.

FIG. 2C1 depicts variants 2C100 of source images that are subjected to patching operations. The source images might comprise one or more segments, which in turn might comprise any combination of one or more unpatched segments an any combinations of patches. As shown, some segments are unpatched segments:

Some segments have one or more patches $212_1$ that are (for example) smaller than, and fully overlapping with, a respective requested segment.

Some segments have one or more patches $212_2$ that are (for example) exactly the same size as a respective requested segment.

Some segments have one or more patches $212_N$ that are (for example) larger than a respective requested segment. Furthermore, some segments have two or more patches that, when combined, are larger than the requested segment.

In addition to the foregoing, other variations may occur. Strictly as examples:

A patch may comprise an IP configuration of a target server.

A patch may indicate a boot device configuration of a target server.

There may be more than one patch per segment.

A single patch can be applied dynamically, such that one patch is applied to more than one location in the source image.

Patches can be applied to different locations on the source image on a per-server basis.

A patch operation can include extending the size of the image and patching the contained file system.

By virtually extending the size of the image and patching the contained file system structure, it is possible to add new files to the source image.

By patching the data structures of the image, files can be virtually deleted.

In some cases, and as can be practiced by embodiments such as given in FIG. 2B, it is possible to create patches based on configuration data. For example, translation steps can be included. As examples, configuration and translation steps can comprise:

Reading a configuration file that specifies which logical files to patch, as well as where (e.g., which nodes).

Reading a configuration file or source image metadata that can be used to determine possible file deletions and/or additions.

Creating a set of patches for metadata and data based on configuration file data and/or metadata contents or structure.

The patching operations that apply can be codified, as is shown and described as pertaining to FIG. 2C2.

FIG. 2C2 depicts patching operation variations 2C200 performed over source images so as to support variations of patching operations. The shown set of operations and decisions commences at step 214, where a segment READ request is received from a target node. Step 217 looks up a configuration or otherwise serves to determine if the request is for a segment that should be subjected to one or more patching operations. If not (see the "No" branch of decision 229) then the requested READ request is satisfied by returning the segment or segments (see step 219). Otherwise, the requested segment is compared with the patch or patches (see step 221). If the patch or patches to be applied are completely overlapping with the requested segment (see step 230), then the READ request is satisfied by sending the patch or patches (see step 225). On the other hand, if the patch overlaps the requested segment, then a patched code segment is assembled (see operation 224), and the request is satisfied by sending the assembled segment that includes the patch or patches (see step 226).

Figure 3:
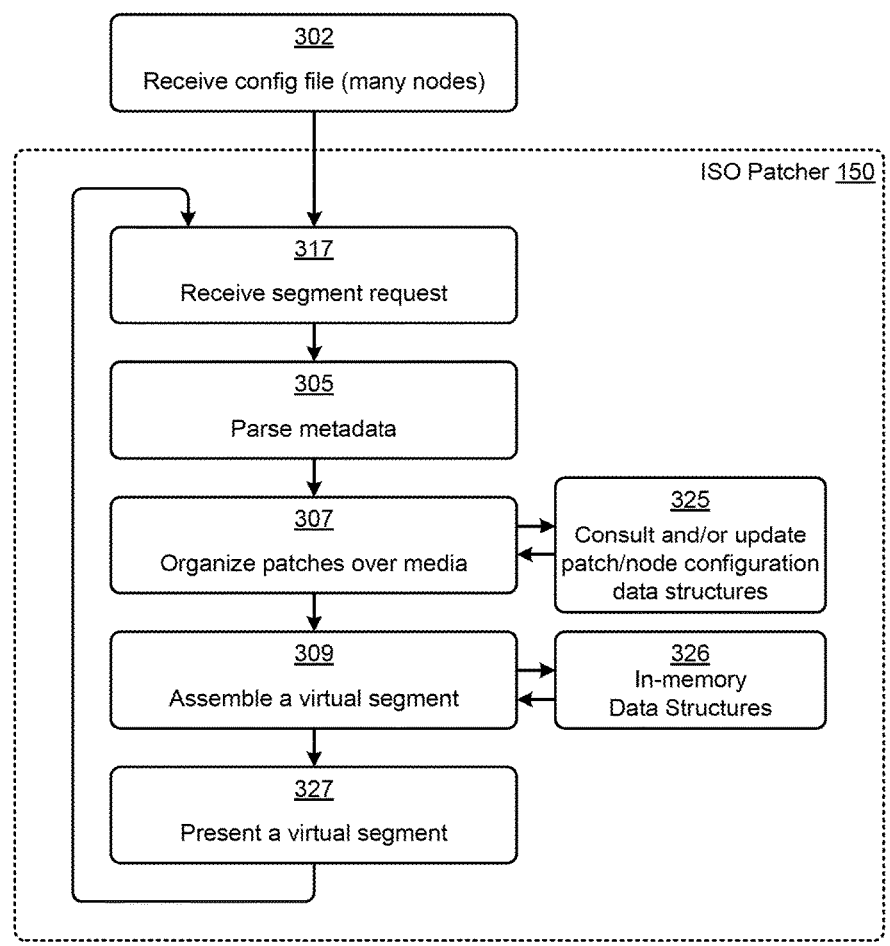
FIG. 3 depicts a multi-node configuration flow used for patching images in a server group, according to some embodiments.

FIG. 3 depicts a multi-node configuration flow used for patching images in a server group. As an option, one or more variations of comparisons 300 or any aspect thereof may be implemented in the context of the architecture and functionality of the embodiments described herein.

At step 302, a module (e.g., an orchestrator) receives a configuration that includes multiple node configurations. An ISO patcher 150 receives a segment request (see step 317). Metadata is parsed to retrieve configuration information pertaining to the requestor (see step 305). The patches are organized to be projected onto the requested segment (see step 307) so as to generate a virtual segment (see step 309). In-memory data structures 326 (e.g., an assembly buffer) may be allocated and populated with segment data and/or patches (or portions thereof). When the generation of the virtual segment is completed, the virtual segment is presented to the requestor (see operation 327). A loop serves to continuously receive and process requests.

In order to choose the correct set of patches for a specific server when processing virtual media read requests, an ISO patcher might need to identify the server making the request. This can be done using variations of several techniques. One technique involves resolving to a requestor based on a server-specific path or URL (e.g., based on a path over which the request is received).

In some cases, such as when it is not possible to set up virtual media with a specific path or URL, the network address of the server can be used to uniquely identify the server and apply the correct set of patches. Often a shared image is served, but the patches applied are specific to the requesting server.

The aforementioned configuration data can comprise any forms of configuration data structures (e.g., see step 325). Strictly as an example, one possible layout of a configuration data structure is shown and described as pertains to FIG. 4.

Figure 4:
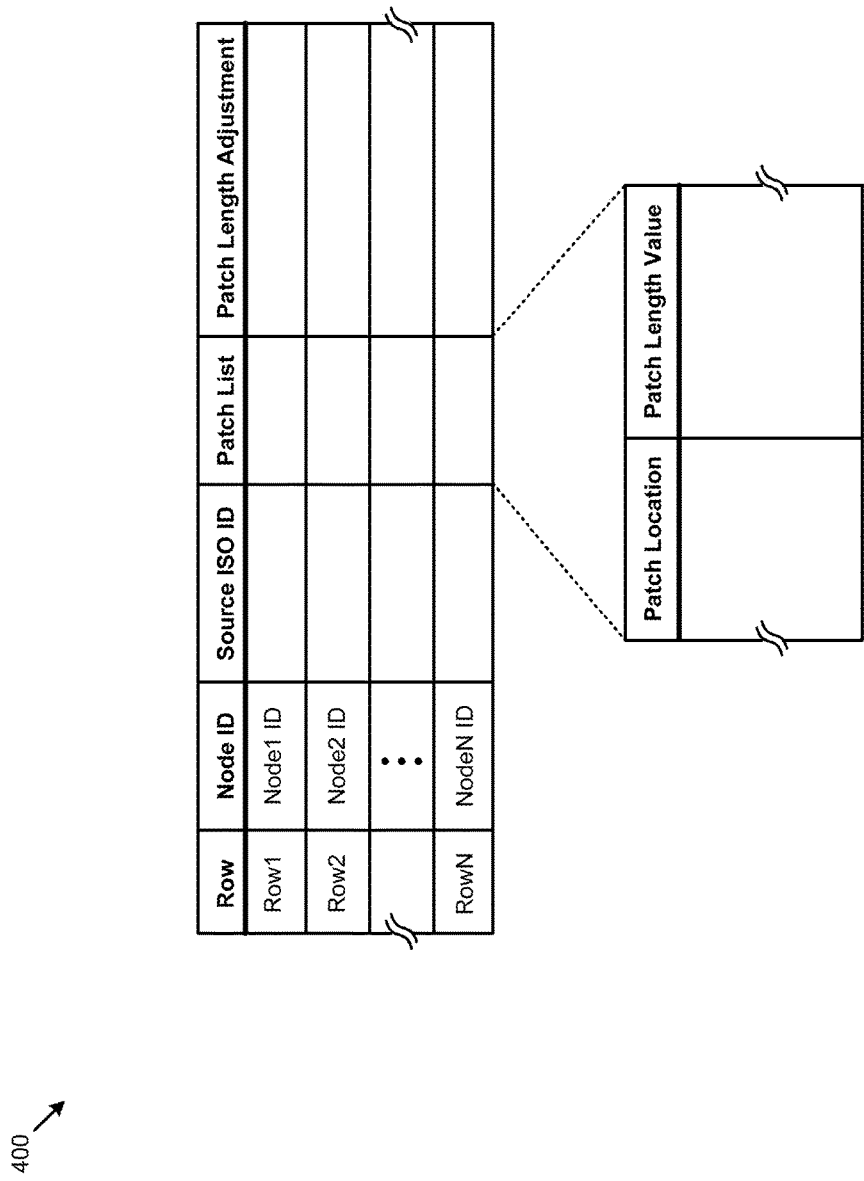
FIG. 4 depicts a configuration data structure used in systems that dynamically patch images using a virtual media source node, according to an embodiment.

FIG. 4 depicts a configuration data structure 400 used in systems that dynamically patch images using a virtual media source node. As an option, one or more variations of configuration data structure 400 or any aspect thereof may be implemented in the context of the architecture and functionality of the embodiments described herein. Also, the configuration data structure 400 or any aspect thereof may be implemented in any environment.

The embodiment shown in FIG. 4 is merely one example layout. Other layouts are possible. Exemplary embodiments include some or all of the information given in Table 1.

TABLE 1

Configuration file

| Ref | Information |
|---|---|
| 1 | "mount":<mount path> # path where patched ISOs should be mounted |
| 2 | { |
| 3 | "source":<source iso path>, |
| 4 | "target":<relative path in mount>, |
| 5 | "patches": [ |
| 6 | { |
| 7 | "file":<absolute path of file to patch>, |
| 8 | "data":<data to inject> |
| 9 | }, |
| 10 | ... # more patch files |
| 11 | ] |
| 12 | }, |
| 13 | ... # more ISOs |
| 14 | ] |

In addition to the information of Table 1, patching operations can be facilitated and/or modified based on parameters such as are given in Table 2.

TABLE 2

Parameters

| Ref | Code | Definition |
|---|---|---|
| 1 | <mount path> | Location where the FUSE namespace should be mounted |
| 2 | <source iso path> | Absolute path of a local ISO image to be dynamically patched; note that such source images will usually be referenced multiple times in this file |
| 3 | <relative path in mount> | Relative path of the virtual patched ISO image in FUSE namespace; it is relative to <mount path> |
| 4 | <absolute path of file to patch> | Path of the file to be patched inside the ISO image |
| 5 | <data to inject> | Absolute path of a file containing the data that should replace the contents of the target file |

FIG. 5A, FIG. 5B, FIG. 5C, FIG. 5D, and FIG. 5E depict implementation views of user space file system access as used in systems that dynamically patch images using a user-space file system. As an option, one or more variations of a virtual media source node (e.g., virtual media source node 140₄, virtual media source node 140₅, virtual media source node 140₆, virtual media source node 140₇, virtual media source node 140₈) and/or user space file system access options or any aspects thereof may be implemented in the context of the architecture and functionality of the embodiments described herein.

Architectural variation 5A00, architectural variation 5B00, and architectural variation 5C00, show how any transport protocol can be used to communicate data between virtual media source node and a server. Some embodiments rely on a standard protocol (e.g., NFS, SMB) while other embodiments rely on proprietary transport protocols, and some embodiments rely in part on a vendor-specific application (e.g., so as to accommodate a vendor-specific protocol). The example architectures are purely exemplary.

Architectural variation 5D00 depicts a partitioning where the ISO patcher is contained within a user space and the VFS is contained within kernel space. File access facilities are provided by a file-straddling file access technique that offers access to a file system from user space (see FUSE, file system in user space).

Architectural variation 5E00 depicts a partitioning where the ISO patcher and the VFS are fully-contained within kernel space.

ADDITIONAL EMBODIMENTS OF THE DISCLOSURE

Additional Practical Application Examples

Some embodiments are applicable to situations such as a diskless boot. In a diskless boot scenario, a patched image is used to boot the server into the desired operating system and/or hypervisor. In some such embodiments, the server is booted from virtual media and does not need any local storage. This is commonly done in high performance computing (HPC) settings.

In another situation, embodiments can be applied to processing and serving patched images. For example, some of the herein-described techniques can be used to inject personally identifiable information, a product key or a serial number, etc. into a downloadable image that is served from a public web server.

Figure 6A:
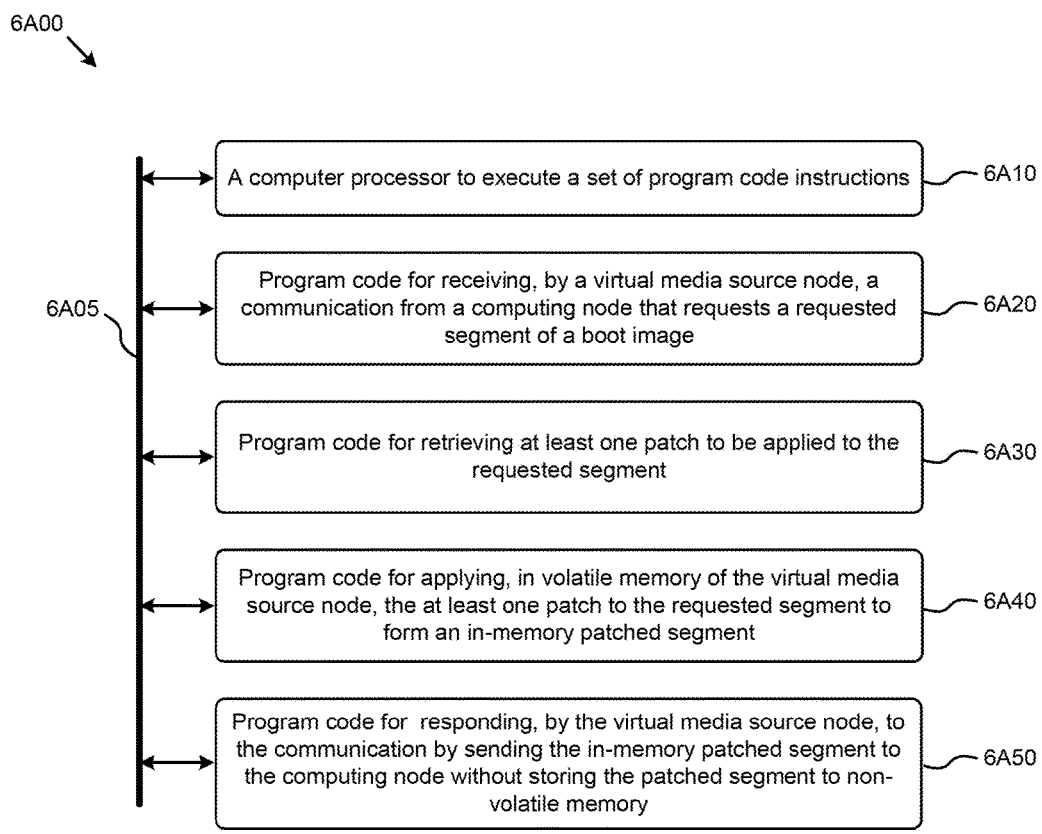
FIG. 6A and FIG. 6B depict system components as arrangements of computing modules that are interconnected so as to implement certain of the herein-disclosed embodiments.

FIG. 6A depicts a system 6A00 as an arrangement of computing modules that are interconnected so as to operate cooperatively to implement certain of the herein-disclosed embodiments. The partitioning of system 6A00 is merely illustrative and other partitions are possible. As an option, the system 6A00 may be implemented in the context of the architecture and functionality of the embodiments described herein. Of course, however, the system 6A00 or any operation therein may be carried out in any desired environment. The system 6A00 comprises at least one processor and at least one memory, the memory serving to store program instructions corresponding to the operations of the system. As shown, an operation can be implemented in whole or in part using program instructions accessible by a module. The modules are connected to a communication path 6A05, and any operation can communicate with other operations over communication path 6A05. The modules of the system can, individually or in combination, perform method operations within system 6A00. Any operations performed within system 6A00 may be performed in any order unless as may be specified in the claims. The shown embodiment implements a portion of a computer system, presented as system 6A00, comprising a computer processor to execute a set of program code instructions (see module 6A10) and modules for accessing memory to hold program code instructions to perform: receiving, by a virtual media source node, a communication from a computing node that requests a requested segment of a boot image (see module 6A20); retrieving at least one patch to be applied to the requested segment (see module 6A30); applying, in volatile memory of the virtual media source node, the at least one patch to the requested segment to form an in-memory patched segment (see module 6A40); and responding, by the virtual media source node, to the communication by sending the in-memory patched segment to the computing node without storing the patched segment to non-volatile memory (see module 6A50).

Figure 6B:
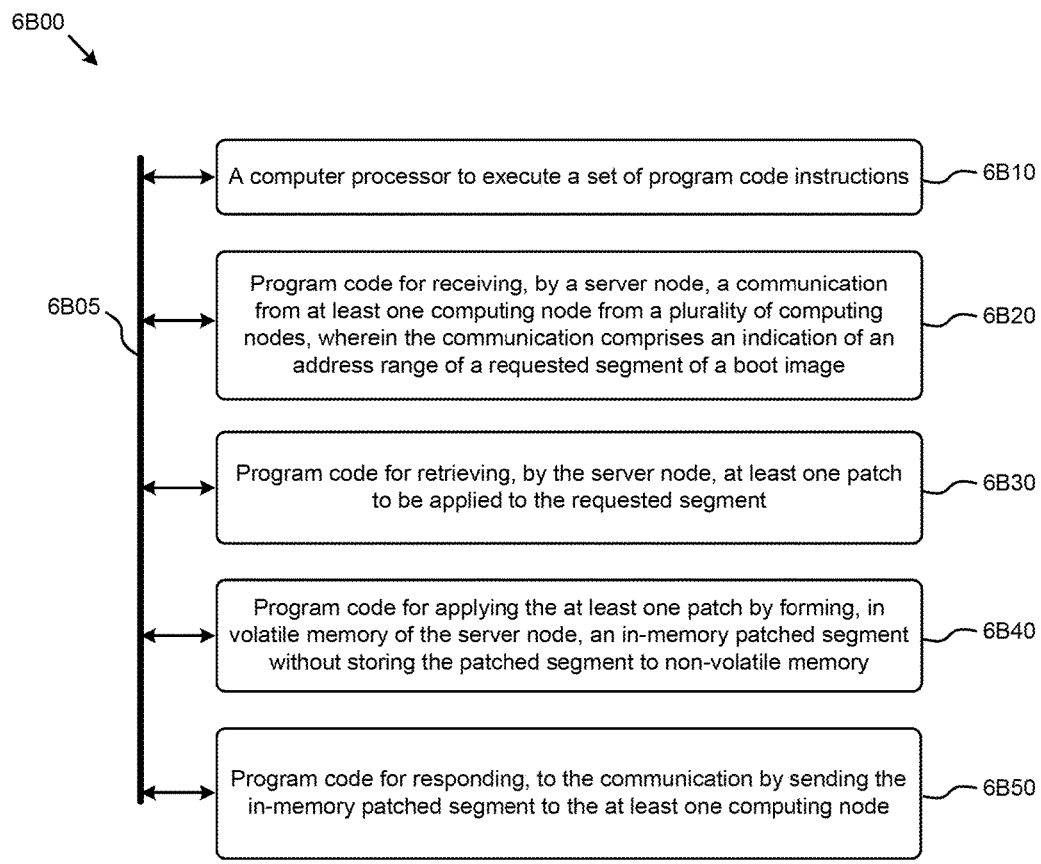

FIG. 6B depicts a system 6B00 as an arrangement of computing modules that are interconnected so as to operate cooperatively to implement certain of the herein-disclosed embodiments. The partitioning of system 6B00 is merely illustrative and other partitions are possible. As an option, the system 6B00 may be implemented in the context of the architecture and functionality of the embodiments described herein. Of course, however, the system 6B00 or any operation therein may be carried out in any desired environment. The system 6B00 comprises at least one processor and at least one memory, the memory serving to store program instructions corresponding to the operations of the system. As shown, an operation can be implemented in whole or in part using program instructions accessible by a module. The modules are connected to a communication path 6B05, and any operation can communicate with other operations over communication path 6B05. The modules of the system can, individually or in combination, perform method operations within system 6B00. Any operations performed within system 6B00 may be performed in any order unless as may be specified in the claims. The shown embodiment implements a portion of a computer system, presented as system 6B00, comprising a computer processor to execute a set of program code instructions (see module 6B10) and modules for accessing memory to hold program code instructions to perform: receiving, by a server node, a communication from at least one computing node from a plurality of computing nodes, wherein the communication comprises an indication of an address range of a requested segment of a boot image (see module 6B20); retrieving, by the server node, at least one patch to be applied to the requested segment (see module 6B30); applying the at least one patch by forming, in volatile memory of the server node, an in-memory patched segment without storing the patched segment to non-volatile memory (see module 6B40); and responding, to the communication by sending the in-memory patched segment to the at least one computing node (see module 6B50).

SYSTEM ARCHITECTURE OVERVIEW

Additional System Architecture Examples

Figure 7A:
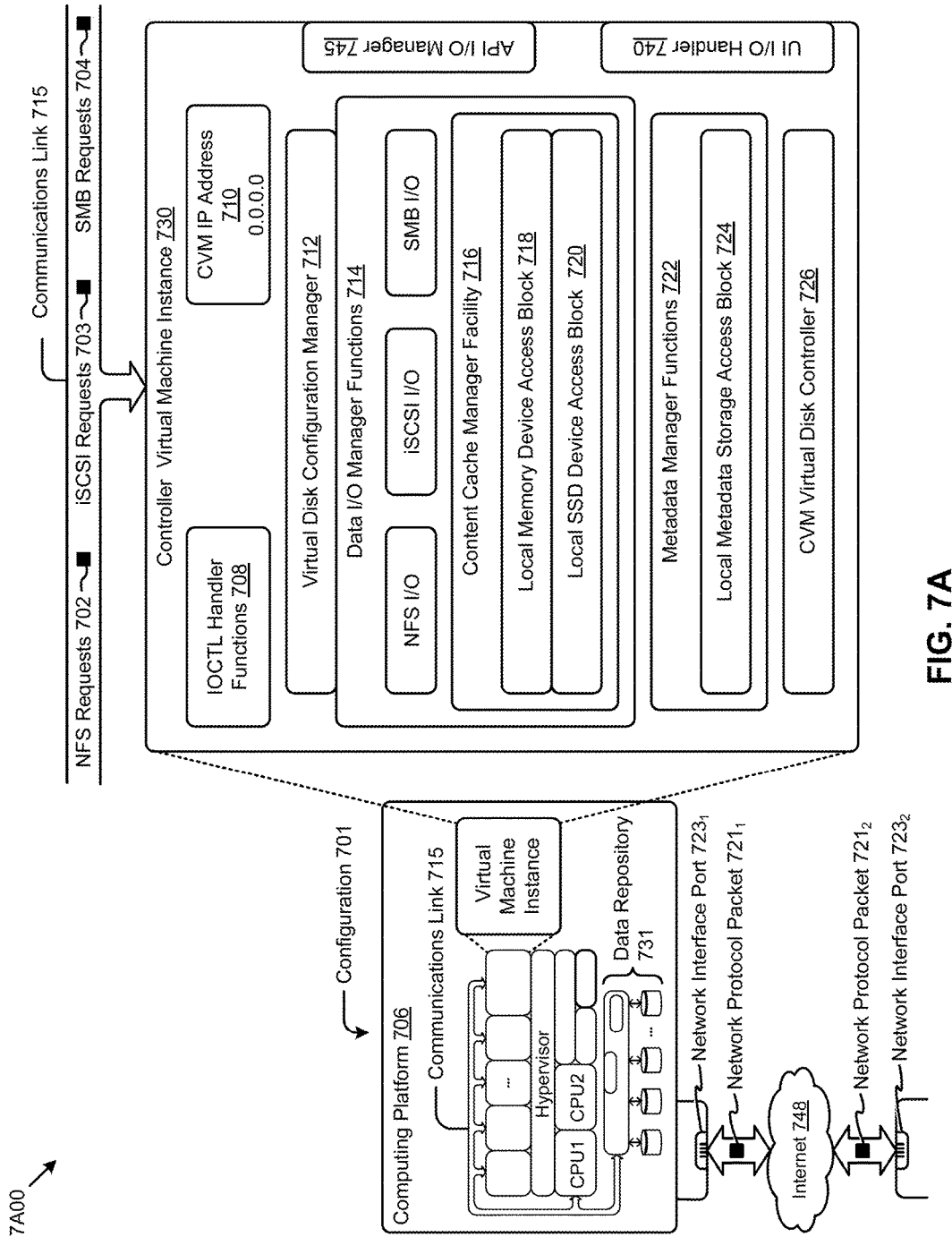
FIG. 7A and FIG. 7B depict architectures comprising collections of interconnected components suitable for implementing embodiments of the present disclosure and/or for use in the herein-described environments.

FIG. 7A depicts a virtual machine architecture 7A00 comprising a collection of interconnected components suitable for implementing embodiments of the present disclosure and/or for use in the herein-described environments. The shown virtual machine architecture 7A00 includes a virtual machine instance in a configuration 701 that is further described as pertaining to the controller virtual machine instance 730. A controller virtual machine instance receives block IO (input/output or I/O) storage requests as of network file system (NFS) requests in the form of NFS requests 702, and/or internet small computer storage interface (iSCSI) block IO requests in the form of iSCSI requests 703, and/or Samba file system requests (SMB) in the form of SMB requests 704. The controller virtual machine instance publishes and responds to an internet protocol (IP) address (e.g., see CVM IP address 710. Various forms of input and output (IO) can be handled by one or more IO control handler IOCTL handler functions 708 that interface to other functions such as data IO manager functions 714, metadata manager functions 722. As shown, the data IO manager functions can include communication with a virtual disk configuration manager 712, and/or can include direct or indirect communication with any of various block IO functions (e.g., NFS IO, iSCSI IO, SMB TO, etc.).

In addition to block IO functions, the configuration 701 supports IO of any form (e.g., block IO, streaming IO, packet-based IO, HTTP traffic, etc.) through either or both of a user interface (UI) handler such as UI IO handler 740 and/or through any of a range of application programming interfaces (APIs), possibly through the shown API IO manager 745.

The communications link 715 can be configured to transmit (e.g., send, receive, signal, etc.) any types of communications packets comprising any organization of data items. The data items can comprise a payload data area as well as a destination address (e.g., a destination IP address), a source address (e.g., a source IP address), and can include various packetization (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases the payload comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions a data processor for execution. Such a medium may take many forms including, but not limited to, non-volatile media and volatile media. Non-volatile media includes, for example, solid state storage devices (SSD), or optical or magnetic disks such as disk drives or tape drives. Volatile media includes dynamic memory such as a random access memory. As shown, the controller virtual machine instance 730 includes a content cache manager facility 716 that accesses storage locations, possibly including local DRAM (e.g., through the local memory device access block 718) and/or possibly including accesses to local solid state storage (e.g., through local SSD device access block 720).

Common forms of computer readable media includes any non-transitory computer readable medium, for example, floppy disk, flexible disk, hard disk, magnetic tape, or any other magnetic medium; CD-ROM or any other optical medium; punch cards, paper tape, or any other physical medium with patterns of holes, or any RAM, PROM, EPROM, FLASH-EPROM, or any other memory chip or cartridge. Any data can be stored, for example, in any form of external data repository 731, which in turn can be formatted into any one or more storage areas, and which can comprise parameterized storage accessible by a key (e.g., a filename, a table name, a block address, an offset address, etc.). An external data repository 731, can store any forms of data, and may comprise a storage area dedicated to storage of metadata pertaining to the stored forms of data. In some cases, metadata, can be divided into portions. Such portions and/or cache copies can be stored in the external storage data repository and/or in a local storage area (e.g., in local DRAM areas and/or in local SSD areas). Such local storage can be accessed using functions provided by a local metadata storage access block 724. The external data repository 731, can be configured using a CVM virtual disk controller 726, which can in turn manage any number or any configuration of virtual disks.

Execution of the sequences of instructions to practice certain embodiments of the disclosure are performed by a one or more instances of a processing element such as a data processor, or such as a central processing unit (e.g., CPU1, CPU2). According to certain embodiments of the disclosure, two or more instances of configuration 701 can be coupled by a communications link 715 (e.g., backplane, LAN, PTSN, wired or wireless network, etc.) and each instance may perform respective portions of sequences of instructions as may be required to practice embodiments of the disclosure The shown computing platform 706 is interconnected to the Internet 748 through one or more network interface ports (e.g., network interface port $723_1$ and network interface port $723_2$). The configuration 701 ca be addressed through one or more network interface ports using an IP address. Any operational element within computing platform 706 can perform sending and receiving operations using any of a range of network protocols, possibly including network protocols that send and receive packets (e.g., see network protocol packet $721_1$ and network protocol packet $721_2$).

The computing platform 706 may transmit and receive messages that can be composed of configuration data, and/or any other forms of data and/or instructions organized into a data structure (e.g., communications packets). In some cases, the data structure includes program code instructions (e.g., application code), communicated through Internet 748 and/or through any one or more instances of communications link 715. Received program code may be processed and/or executed by a CPU as it is received and/or program code may be stored in any volatile or non-volatile storage for later execution. Program code can be transmitted via an upload (e.g., an upload from an access device over the Internet 748 to computing platform 706). Further, program code and/or results of executing program code can be delivered to a particular user via a download (e.g., a download from the computing platform 706 over the Internet 748 to an access device).

The configuration 701 is merely one sample configuration. Other configurations or partitions can include further data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor. Some embodiments include one or more special-purpose hardware components (e.g., power control, logic, sensors, transducers, etc.). A module may include one or more state machines and/or combinational logic used to implement or facilitate the operational and/or performance characteristics of dynamically preparing server-specific installation images using a virtual media source node.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of dynamically preparing server-specific installation images using a virtual media source node). Such files or records can be brought into and/or stored in volatile or non-volatile memory.

Figure 7B:
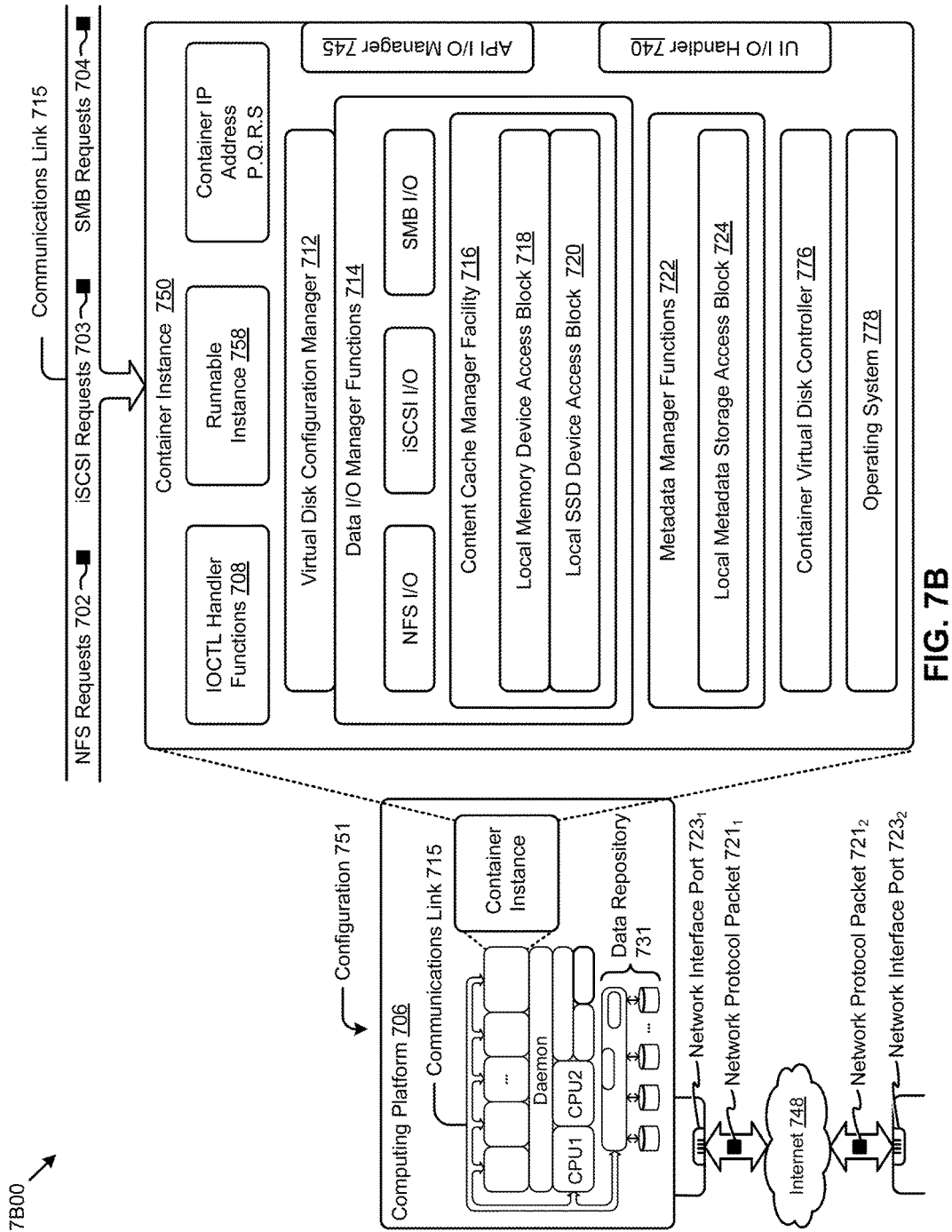

FIG. 7B depicts a containerized architecture 7B00 comprising a collection of interconnected components suitable for implementing embodiments of the present disclosure and/or for use in the herein-described environments. The shown containerized architecture 7B00 includes a container instance in a configuration 751 that is further described as pertaining to the container instance 750. The configuration 751 includes a daemon (as shown) that performs addressing functions such as providing access to external requestors via IP address (e.g., "P.Q.R.S", as shown), a protocol specification (e.g., "http:") and possibly port specifications. The daemon can perform port forwarding to the container. A container can be rooted in a directory system, and can be accessed by file system commands (e.g., "ls" or "ls-a", etc.). The container might optionally include an operating system 778, however such an operating system need not be provided. Instead, a container can include a runnable instance 758, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to a container virtual disk controller 776. Such a container virtual disk controller can perform any of the functions that the aforementioned CVM virtual disk controller 726, yet such a container virtual disk controller does not rely on a hypervisor or any particular operating system so as to perform its range of functions.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method comprising:
   receiving, by a server node, a communication from at least one computing node from a plurality of computing nodes, the communication comprising an indication of an address range of a requested segment of a boot image in non-volatile storage accessed by the server node;

retrieving, by the server node, at least one patch to be applied to the requested segment in response to the communication from the at least one computing node;

applying the at least one patch without changing the boot image in the non-volatile storage by forming, in volatile memory of the server node, an in-memory patched segment of the boot image without storing the patched segment to non-volatile memory; and responding, to the communication by sending at least the in-memory patched segment to the at least one computing node.

2. The method of claim 1, wherein the server node is a laptop computer.

3. The method of claim 1, wherein the plurality of computing nodes is a computing cluster.

4. The method of claim 3, wherein the computing cluster comprises heterogeneous nodes.

5. The method of claim 1, further comprising determining when the at least one patch completely overlaps the requested segment of the boot image.

6. The method of claim 1, further comprising determining when the at least one patch only partially overlaps the requested segment of a boot image.

7. The method of claim 6, wherein the at least one patch to be applied to the requested segment comprises two or more patches.

8. The method of claim 1, wherein the in-memory patched segment forms a portion of an ISO image comprising at least a portion of the boot image and at least the in-memory patched segment, the server node maintains a plurality of in-memory patched segments to be provided in response to communications from nodes of the plurality of nodes.

9. The method of claim 1, wherein the boot image comprises at least a portion of at least one of, a Linux boot image, a Windows boot image, or an ESX installable image.

10. The method of claim 1, wherein the boot image comprises at least a portion of, hypervisor executable program code, or a virtual machine executable program code, or patched code segments thereto.

11. A non-transitory computer readable medium, the non-transitory computer readable medium having stored thereon a sequence of instructions which, when stored in memory and executed by a processor causes the processor to perform a set of acts, the set of acts comprising:

receiving, by a server node, a communication from at least one computing node from a plurality of computing nodes, the communication comprising an indication of an address range of a requested segment of a boot image in non-volatile storage accessed by the server node;

retrieving, by the server node, at least one patch to be applied to the requested segment in response to the communication from the at least one computing node;

applying the at least one patch without changing the boot image in the non-volatile storage by forming, in volatile memory of the server node, an in-memory patched segment of the boot image without storing the patched segment to non-volatile memory; and responding, to the communication by sending at least the in-memory patched segment to the at least one computing node.

12. The computer readable medium of claim 11, wherein the server node is a laptop computer.

13. The computer readable medium of claim 11, wherein the plurality of computing nodes is a computing cluster.

14. The computer readable medium of claim 13, wherein the computing cluster comprises heterogeneous nodes.

15. The computer readable medium of claim 11, further comprising instructions which, when stored in memory and executed by the processor causes the processor to perform acts of determining when the at least one patch completely overlaps the requested segment of the boot image.

16. The computer readable medium of claim 11, further comprising instructions which, when stored in memory and executed by the processor causes the processor to perform acts of determining when the at least one patch only partially overlaps the requested segment of a boot image.

17. The computer readable medium of claim 16, wherein the at least one patch to be applied to the requested segment comprises two or more patches.

18. The computer readable medium of claim 11, wherein the in-memory patched segment forms a portion of an ISO image comprising at least a portion of the boot image and at least the in-memory patched segment, the server node maintains a plurality of in-memory patched segments to be provided in response to communications from nodes of the plurality of nodes.

19. A system comprising:

a storage medium having stored thereon a sequence of instructions; and a processor or processors that execute the sequence of instructions to cause the processor or processors to perform a set of acts, the set of acts comprising:

receiving, by a server node, a communication from at least one computing node from a plurality of computing nodes, the communication comprising an indication of an address range of a requested segment of a boot image in non-volatile storage accessed by the server node;

retrieving, by the server node, at least one patch to be applied to the requested segment in response to the communication from the at least one computing node;

applying the at least one patch without changing the boot image in the non-volatile storage by forming, in volatile memory of the server node, an in-memory patched segment of the boot image without storing the patched segment to non-volatile memory; and responding, to the communication by sending at least the in-memory patched segment to the at least one computing node.

20. The system of claim 19, wherein the boot image comprises at least a portion of at least one of, a Linux boot image, a Windows boot image, or an ESX installable image.

\* \* \* \* \*